United States Patent
Rodrigues

(10) Patent No.: US 11,530,682 B2
(45) Date of Patent: Dec. 20, 2022

(54) VERTICAL AXIS WIND TURBINE AIR CONCENTRATION TOWER WITH REDUCED RADAR CROSS SECTION

(71) Applicant: Dilson dos Santos Rodrigues, Hewitt, TX (US)

(72) Inventor: Dilson dos Santos Rodrigues, Hewitt, TX (US)

(*) Notice: Subject to any disclaimer, the term of this patent is extended or adjusted under 35 U.S.C. 154(b) by 0 days.

(21) Appl. No.: 17/493,841

(22) Filed: Oct. 5, 2021

(65) Prior Publication Data

US 2022/0025850 A1 Jan. 27, 2022

Related U.S. Application Data

(63) Continuation-in-part of application No. 16/747,523, filed on Jan. 20, 2020, now Pat. No. 11,136,959.

(51) Int. Cl.
*F03D 3/00* (2006.01)
*F03D 3/04* (2006.01)

(52) U.S. Cl.
CPC ............ *F03D 3/005* (2013.01); *F03D 3/0418* (2013.01); *F05B 2240/214* (2013.01); *F05B 2250/131* (2013.01); *F05B 2260/99* (2013.01); *F05B 2280/101* (2013.01); *F05B 2280/5005* (2013.01)

(58) Field of Classification Search
CPC . F03D 3/005; F03D 3/067; F03D 3/25; F03D 3/0418; F05B 2240/211; F05B 2240/214; F05B 2260/72; Y02E 10/74
See application file for complete search history.

(56) References Cited

U.S. PATENT DOCUMENTS

| | | | | |
|---|---|---|---|---|
| 3,995,170 A | * | 11/1976 | Graybill | F03D 3/067 290/55 |
| 4,293,274 A | * | 10/1981 | Gilman | F03D 7/06 416/88 |
| 4,406,584 A | * | 9/1983 | Stepp | F03D 7/06 416/41 |
| 4,496,283 A | * | 1/1985 | Kodric | F03D 3/067 416/119 |
| 4,764,090 A | * | 8/1988 | Danson | F03D 3/068 416/17 |
| 2011/0181047 A1 | * | 7/2011 | Dulcetti Filho | F03D 3/062 290/55 |
| 2012/0243990 A1 | * | 9/2012 | Kosch | F03D 7/06 416/9 |

(Continued)

*Primary Examiner* — Igor Kershteyn
(74) *Attorney, Agent, or Firm* — Thrasher Associates

(57) ABSTRACT

Disclosed is a vertical axis wind turbine air concentration tower with reduced radar cross section. The air concentration tower has a polygonal outer perimeter, a pivot located at each vertex of the polygonal outer perimeter, and an inwardly-positioned rudder blade operatively connected at each pivot. Each inwardly positioned rudder blade has a first wind-neutral position, and is pivotable through a plurality of angles that adjust based on an incoming wind direction, such that the incoming wind is channeled to the vertical axis wind turbine, which is located approximately at a center area of the polygonal outer perimeter. A radar absorbent material is applied to the vertical axis wind turbine air concentration tower to reduce the radar cross section. The air concentration tower is designed to provide higher wind speed to the vertical axis wind turbine than the surrounding ambient air.

12 Claims, 9 Drawing Sheets

(56) References Cited

U.S. PATENT DOCUMENTS

| | | | | |
|---|---|---|---|---|
| 2013/0285382 A1* | 10/2013 | Grigg | ................ | F03D 9/25 |
| | | | | 290/54 |
| 2014/0147274 A1* | 5/2014 | Longmire | ................ | F03D 7/06 |
| | | | | 416/13 |
| 2014/0361539 A1* | 12/2014 | Carter | ................ | F03D 3/065 |
| | | | | 290/44 |
| 2020/0149509 A1* | 5/2020 | Rodrigues | ............ | F03D 3/0418 |

* cited by examiner

VERTICAL AXIS WIND TURBINE AIR CONCENTRATION TOWER WITH REDUCED RADAR CROSS SECTION

CROSS-REFERENCE TO RELATED APPLICATION

The invention is related to and claims priority from co-pending U.S. Non-Provisional patent application Ser. No. 16/747,523 entitled AIR CONCENTRATION TOWER FOR WIND TURBINE to common inventor dos Santos Rodrigues filed on Jan. 20, 2020, which is a Continuation in Part of and claims priority from U.S. Non-Provisional patent application Ser. No. 15/263,378 entitled VERTICAL WIND TURBINE filed on Sep. 13, 2016 also to common inventor dos Santos Rodrigues.

TECHNICAL FIELD

The present invention is generally related to a vertical axis wind turbine (VAWT), and more particularly, is related to reducing radar cross section of the vertical axis wind turbines (VAWTs).

STATEMENT OF PROBLEMS ADDRESSED BY THIS INVENTION

Interpretation Considerations

This section describes technical field in detail and discusses problems encountered in the technical field. Therefore, statements in the section are not to be construed as prior art.

Discussion of History of the Problem

Wind energy is one of the most cost-effective forms of renewable energy, with ever-increasing global installed capacity. For example, as of 2015 Denmark, by percentage, generated 40% of its electric power from wind.

Wind turbines are generally categorized as horizontal axis wind turbines (HAWTs) or vertical axis wind turbines (VAWTs). A VAWT is more efficient, simpler, and significantly cheaper to build and maintain than an HAWT. VAWTs have other advantages, such as they always face the wind that enable the production of cheap and clean electricity. Furthermore, VAWTs do not require steering into the wind and have a large surface area for capturing wind energy. VAWTs can be installed at various locations, including roofs, highways, and parking lots. These produce less noise and can be scaled up from milliwatts to megawatts.

The demand for renewable energy is on the rise; as a result, there is increasing focus on developing advanced models of VAWTs. The design of a conventional VAWT is complex, as the offset shaft is located outside the turbine axis. Furthermore, the offset shaft emerges from an independent shaft, resulting in unstable offset shaft operations.

Unfortunately, wind power remains stubbornly difficult to deploy. For example, a conventional VAWT has a relatively significant radar cross section (RCS) and creates radar reflections large enough to interfere with the monitoring of aircraft near airports. If a region affected by the VAWT is large enough, even known aircraft can be difficult to differentiate as they fly over the VAWT, and detection of the aircraft may be lost. Consequently, above mentioned event greatly decreases the ability of the air traffic controller to maintain a safe operating environment. Accordingly, VAWTs (indeed, all large wind turbines) are prohibited from being installed near airports or any other facilities that rely on radar systems.

Accordingly, there exists a need for systems and features that reduce radar cross section for VAWTs. The present invention provides such systems, methods, devices and features.

SUMMARY OF THE INVENTION

According to the embodiments illustrated herein, a VAWT apparatus is provided that concentrates air flow such that air reaching the VAWT is faster than the ambient air surrounding the concentration tower. The apparatus includes a fixed turbine axis, a plurality of carousal shafts, a plurality of carousal plates, a plurality of turbine blades, an offset shaft assembly, a plurality of OTSs, a plurality of counterweights, and a plurality of timing and restricting shafts (TRSs).

The carousal shafts are operatively connected to the fixed turbine axis. The carousal plates are attached to the carousal shafts. The turbine blades are pivotally attached to the carousal plates. The plurality of turbine blades includes one or multiple first turbine blades to receive wind, and one or more second turbine blades that are unexposed to wind. In one embodiment, the first turbine blade is exposed to a maximum area by stretching away from the fixed turbine axis and the second turbine blade gets folded inside toward the fixed turbine axis.

In an aspect of the present invention, a vertical axis wind turbine air concentration tower (VAWT ACT) with reduced radar cross section is provided. The VAWT ACT includes a polygonal outer perimeter; a pivot located at each vertex of the polygonal outer perimeter; and a rudder blade mechanically linked to the pivot to oscillate based on an incoming wind direction wherein the rudder blade is inwardly-positioned having a first wind-neutral position, and is pivotable through a plurality of angles that adjust based on the incoming wind direction.

In this configuration of stacked modules, wind flow is channeled through each of the plurality of single-modules. Each of the plurality of single-modules comprises a vertical axis wind turbine. The plurality of single-modules stack to channel wind flow through each module to increase wind speed and power at each of the vertical axis wind turbine. The wind flow is channeled to each of VAWT located at a center area of the polygonal outer perimeter of each of the plurality of single-modules. The center area has the vertical axis wind turbine with a fixed turbine axis. Each of the vertical axis wind turbine is an elliptical vertical axis wind turbine. Each of the vertical axis wind turbine turns each generator. Preferably, up to four modules may be stacked. However, in certain applications more or fewer units may be desirable.

Further, the VAWT ACT is coated with a radar-absorbent material to reduce the radar cross section. The radar-absorbent material comprises at least one of carbonyl iron or ferrite, interspersed ferric compound particles, neoprene material, a urethane foam having conductive carbon black, for example.

The polygonal outer perimeter is flat and angled in such a way that radar beams falling at a large angle bounces off at a similar high reflected angle, thereby reducing the radar cross section. Incident angles $\Sigma$ (sigma) and $\theta$ (theta) at which the radar beams hit a particular portion of the air concentration tower are high when measured with reference to an imaginary axis XY. The incident angles Σ (sigma) and θ (theta) are between 90 degrees to 150 degrees with respect to the imaginary axis XY.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. A person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DESCRIPTION OF AN EXEMPLARY PREFERRED EMBODIMENT

Interpretation Considerations

Figure 1:
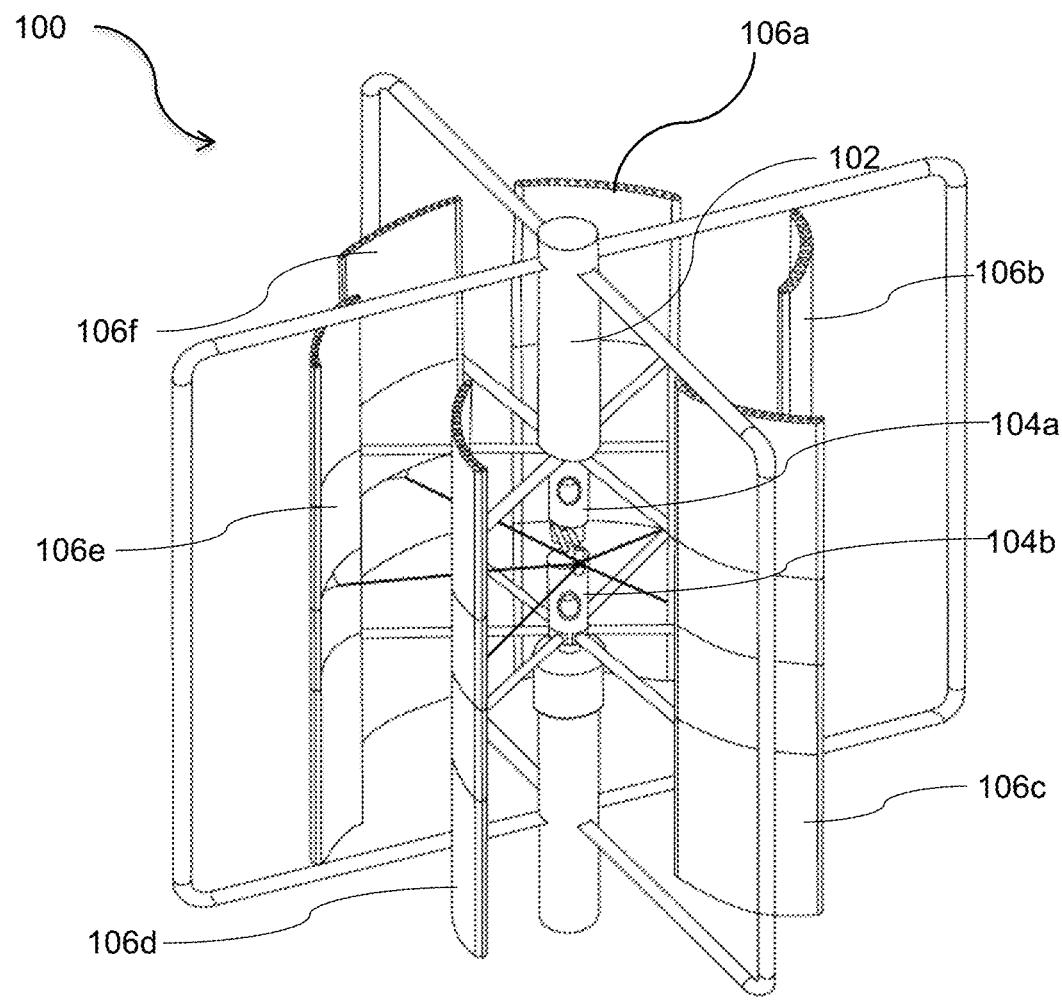
FIG. 1 illustrates a general view of the VAWT apparatus.

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment", "at least one embodiment", "an embodiment", "one example", "an example", "for example", and so on indicate that the embodiment(s) or example(s) may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Unless defined otherwise, all technical and scientific terms used herein have the same meaning as commonly understood by one of the ordinary skills in the art to which this invention belongs. Although any method and material similar or equivalent to those described herein can also be used in the practice or testing of the present invention, the preferred methods and materials have been described. All publications, patents, and patent applications mentioned herein are incorporated in their entirety.

It is noted that as used herein and in the appended claims, the singular forms "a", "and", and "the" include plural referents, unless the context clearly dictates otherwise. In the claims, the terms "first", "second", and so forth are to be interpreted merely as ordinal designations; they shall not be limited in themselves. Furthermore, the use of exclusive terminology such as "solely", "only", and the like in connection with the recitation of any claim element is contemplated. It is also contemplated that any element indicated to be optional herein may be specifically excluded from a given claim by way of a "negative" limitation. Finally, it is contemplated that any optional feature of the inventive variation(s) described herein may be set forth and claimed independently or in combination with any one or more of the features described herein.

All references cited herein, including publications, patent applications, and patents, are hereby incorporated by reference to the same extent as if each reference were individually and specifically indicated to be incorporated by reference, and were set forth in its entirety herein.

The recitation of ranges of values herein is merely intended to serve as a shorthand method of referring individually to each separate value falling within the range, unless otherwise indicated herein, and each separate value is incorporated into the specification as if it were individually recited herein.

FIG. 1 illustrates a general view of apparatus 100, in accordance with at least one embodiment. Apparatus 100 includes a fixed turbine axis 102, a plurality of carousal shafts (shown and explained in conjunction with FIG. 2), a plurality of carousal plates 104*a* and 104*b*, a plurality of turbine blades 106 (*a-f*), an offset shaft assembly (shown and explained in conjunction with FIG. 2), a plurality of offset timing shafts (shown and explained in conjunction with FIG. 2-3), a plurality of counterweights (shown and explained in conjunction with FIG. 2), a plurality of timing and restricting shafts (shown and explained in conjunction with FIG. 3), and a generator (shown and explained in conjunction with FIG. 5). The carousal shafts (shown and explained in conjunction with FIG. 2) operatively connected to the fixed turbine axis 102, and the carousal plates 104a, and 104b attached to the carousal shafts (shown and explained in conjunction with FIG. 2).

The turbine blades 106 (a-f) pivotally attached to the carousal plates 104a, and 104b. The turbine blades 106 (a-f) includes one or more first turbine blades to receive wind and one or more second turbine blades that are not exposed to wind. The one or more first turbine blades are exposed to a maximum area by stretching away from the fixed turbine axis. Further the one or more second turbine blades get folded inside toward the fixed turbine axis.

The offset shaft assembly (shown and explained in conjunction with FIG. 2) configured at a middle part of the fixed turbine axis 102. The offset shaft assembly (shown and explained in conjunction with FIG. 2) includes an offset timing shaft (OTS), and a plurality of counterweights (shown and explained in conjunction with FIG. 2).

The offset timing shafts (OTSs) (shown and explained in conjunction with FIG. 2-3) suspended to the plurality of carousal shaft (202a, and 202b). The OTS (shown and explained in conjunction with FIG. 2-3) is offset from the center of the plurality of carousal plates 104a and 104b and floats freely from the respective suspended carousal shaft (shown and explained in conjunction with FIG. 2) in order to reduce the aerodynamic drag.

The counterweights (shown and explained in conjunction with FIG. 2) form a junction between the top carousal shaft 202a and the bottom carousal shaft 202b. The plurality of timing and restricting shafts (TRSs) (shown and explained in conjunction with FIG. 3) emerge from the offset timing shaft (shown and explained in conjunction with FIG. 2-3) to connect with the plurality of turbine blades 106 (a-f) in order to execute the operations of stretching away and folding inside. In an alternative embodiment plurality of offset timing shaft (shown and explained in conjunction with FIG. 2-3) may connected to the plurality of TRSs (shown and explained in conjunction with FIG. 3).

Figure 2:
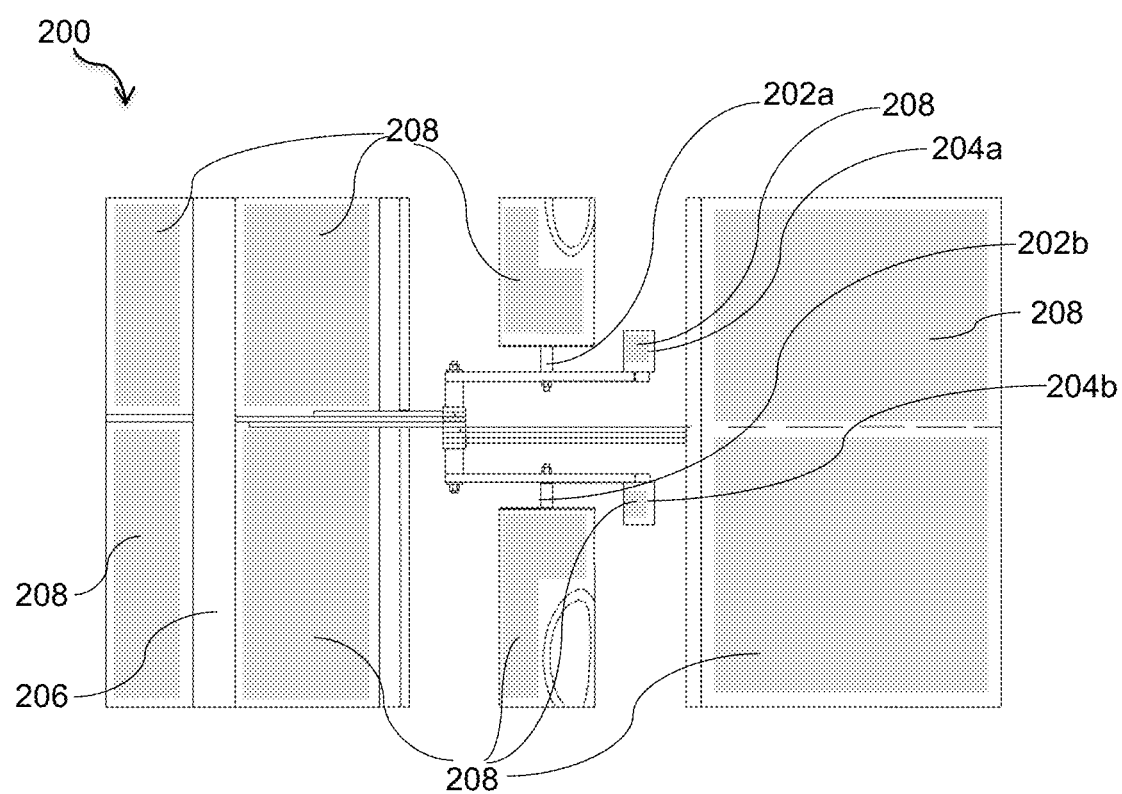
FIG. 2 illustrates an exploded view of the offset shaft assembly.

FIG. 2 illustrates an exploded view of offset shaft assembly 200, in accordance with at least one embodiment. A plurality of carousal shafts 202a and 202b is operatively connected to the fixed turbine axis 102 (shown in FIG. 1). The plurality of carousal shafts includes a top carousal shaft 202a and a bottom carousal shaft 202b. The bottom carousal shaft 202b is coupled to the top carousal shaft 202a. In one embodiment, the top carousal shaft 202a and the bottom carousal shaft 202b are mounted to central carousal plates 104a and 104b (shown in FIG. 1), located at the center of the carousal. Therefore, carousal plates 104a and 104b (shown in FIG. 1) are attached to the plurality of carousal shafts 202a and 202b. The offset shaft assembly 200 further includes a top counterweight 204a and a bottom counterweight 204b to form a junction between the top carousal shaft 202a and the bottom carousal shaft 202b.

Turbine blades 106a, 106b, 106c, 106d, 106e, and 106f (shown in FIG. 1) are pivotally attached to the plurality of carousal plates 104a and 104b. The plurality of turbine blades 106 (a-f) includes one or more first turbine blades to receive wind. One or more second turbine blades are not exposed to wind. In one embodiment, the first turbine blade is exposed to a maximum area by stretching it away from the fixed turbine axis 102, and the second turbine blade gets folded inside toward the fixed turbine axis 102. Offset shaft assembly 200 is configured at the middle part of the fixed turbine axis 102 (shown in FIG. 1). Also shown in FIG. 2, but described below, are radar absorbing elements of Radar Absorbent Material (RAM), such as RAM 208.

Although RAM is shown as generally coating the surface of the ACT, wings and wind turbine, preferably, RAM coats every radar-exposed surface of an air concentration tower. Additionally, different types of RAM may coat different surfaces to achieve performance characteristics such as wear versus radar-absorbing effectiveness versus weather resistance/heat resistance, for example.

Figure 3:
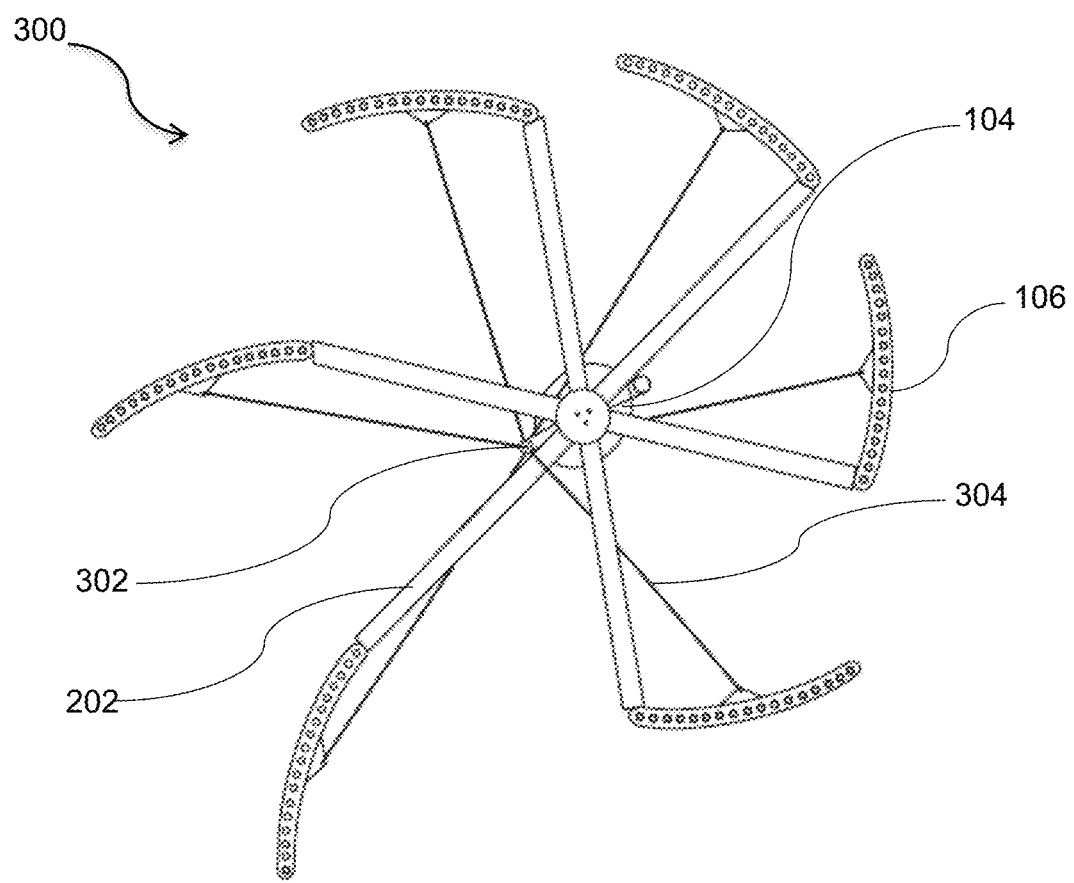
FIG. 3 illustrates the top view of the VAWT apparatus.

FIG. 3 illustrates the top view 300 of apparatus 100, in accordance with at least one embodiment. Offset shaft assembly 200 (shown in FIG. 2) includes an offset timing shaft (OTS) 302 suspended to carousal shaft 202. In one embodiment, the OTS 302 is offset from the center of the plurality of carousal plates 104a and 104b. It floats freely from the suspended carousal shaft 202, in order to reduce the aerodynamic drag.

The offset timing shaft (OTS) 302 is placed within the fixed turbine axis 102. The plurality of OTS 302 is positioned in the direction of the first turbine blade exposed to wind. Offset shaft assembly 200 further includes a plurality of counterweights 204 (shown in FIG. 2) to form a junction between the top carousal shaft 202a and the bottom carousal shaft 202b. The plurality of counterweights 204 includes a top counterweight 204a and a bottom counterweight 204b.

TRS 304 emerges from offset timing shaft 302 to connect with a plurality of turbine blades 106 in order to execute the operations of stretching away and folding inside. In an embodiment the TRS 304 is preferably connected at the central region of the turbine blade 106, TRS 304 controls the blade's opening and closing operations. TRS 304 for each turbine blade 106 is connected to OTS 302. In an alternative embodiment TRS 304 is used to restrict the movement of the OTS 302 due to wind forces being applied to the turbine blades 106 (a-f). Further in another embodiment the TRS 304 comprises two cylindrical tubes with shock absorbing mechanism or sudden thrust dampener, which may reduce the sudden air blow associated damages. Furthermore, the TRS 304 is connected with shaft alignment and synchronization control or feedback loop in order to regulate axial movements of OTS 302.

Turbine blade 106 is modeled on an airplane wing, because in the present VAWT, these blades function like an airplane wing. As wind hits the turbine blades, the blades will drive the top and bottom carousals to turn the generator (shown in FIG. 5). The blade creates a vacuum on the backside of the turbine blade to increase the forward drive force.

Figure 4:
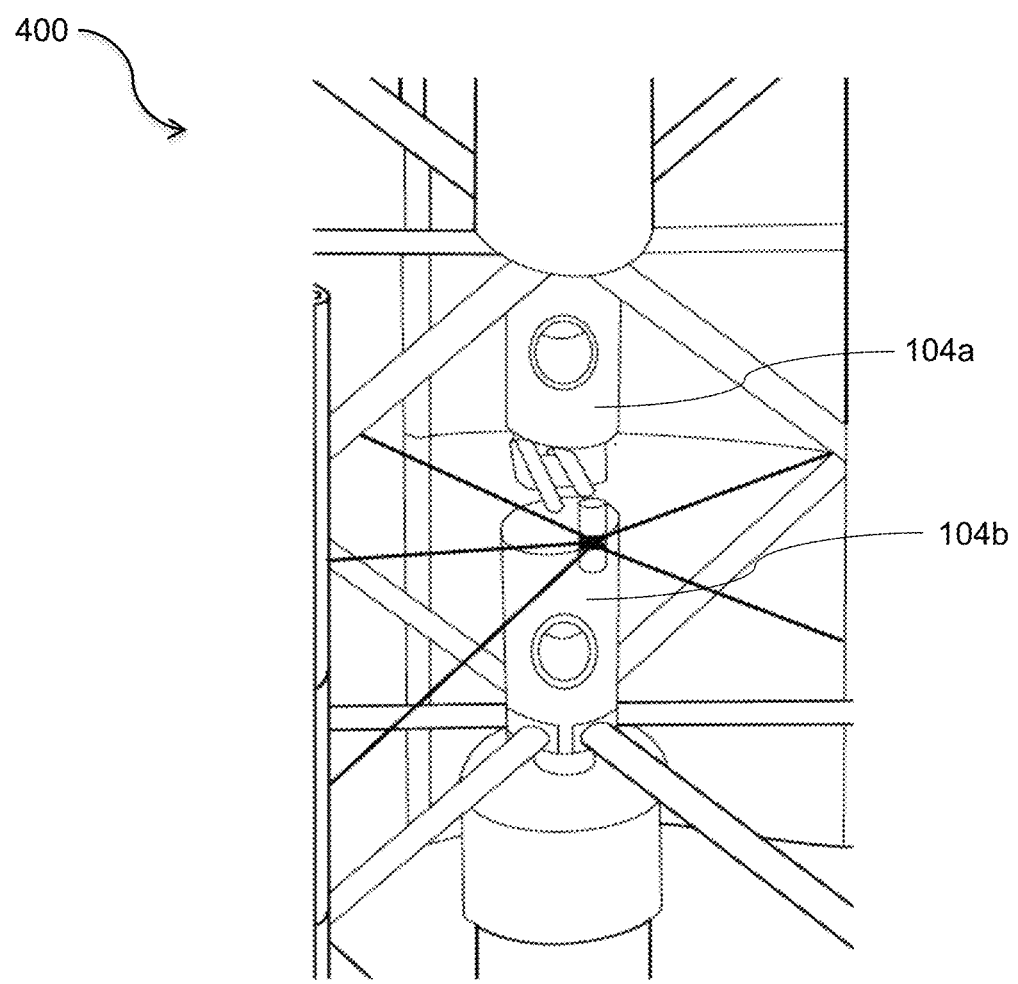
FIG. 4 illustrates an exploded view of the carousal plates.
Figure 5:
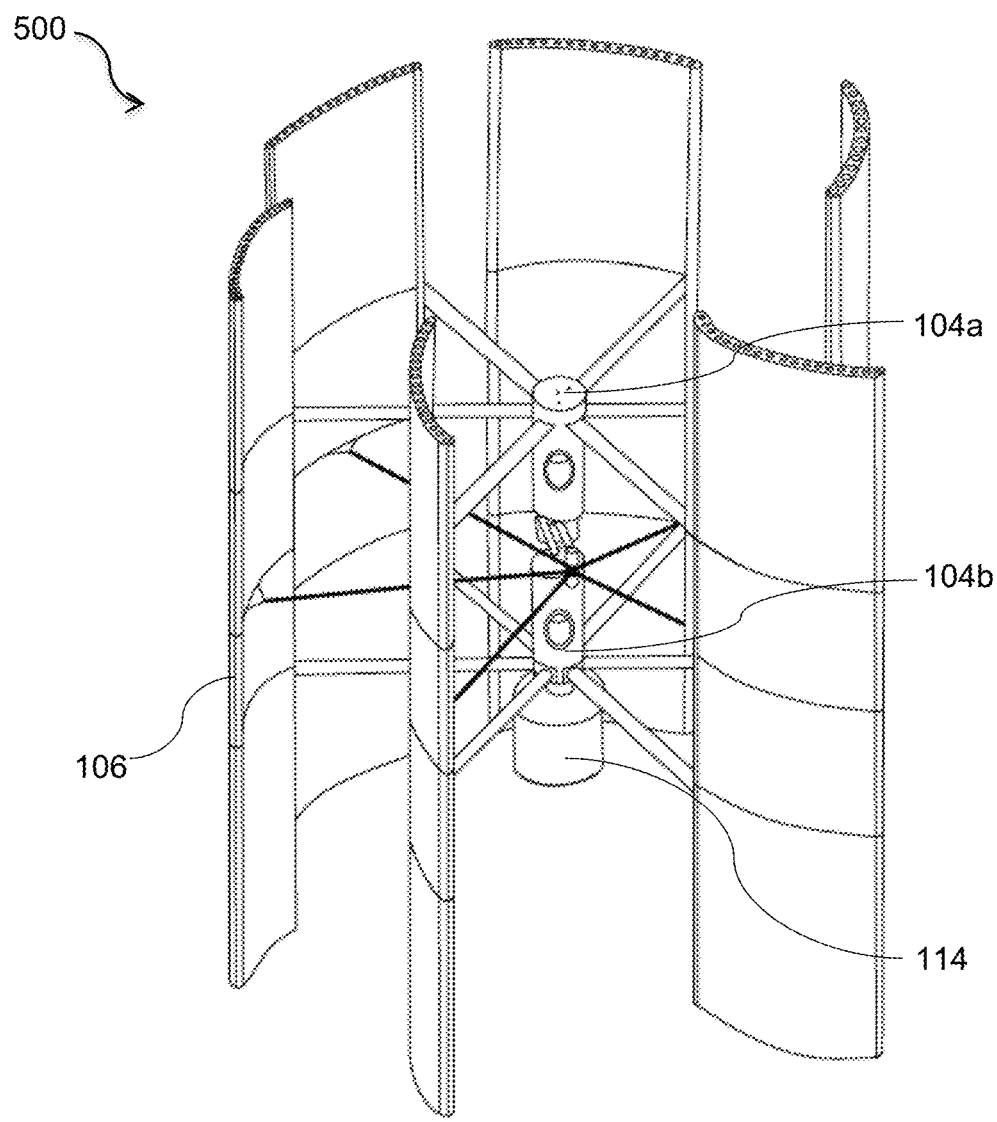
FIG. 5 illustrates an exemplary view of the VAWT.

FIG. 4 illustrates an exploded view 400 of carousal plates 104a and 104b, in accordance with at least one embodiment. FIG. 4 is described in conjunction with FIG. 5. FIG. 5 illustrates a side view 500 of a VAWT, in accordance with at least one embodiment. The top carousal plate 104a is attached to the top carousal shaft 202a. The bottom carousal plate 104b is attached to the bottom carousal shaft 202b. The apparatus 100 further includes a generator 502. In alternative embodiment, generator comprises six separate subunits which are connected to individual turbine blades to generate energy. The entire carousal assembly (104 and 202) rotates in order to power the generator 502. The present carousal assembly (104 and 202) takes advantage of the additional rotational speed possible for offset shaft assembly 200 from the timing and restricting shaft (304) of individual turbine blades 106, enhancing the effect of the actual wind speed.

The plurality of turbine blades 106 (a-f) are hinged to top carousal shaft 202a and bottom carousal shaft 202b with a pin and bearing assembly, in order to receive wind and drive top carousal shaft 202a and bottom shaft 202b. In an alternative embodiment the pin and bearing assembly may also provide the pivotal movement to the top carousal shaft 202a and bottom carousal shaft 202b. The apparatus 100 may include a control mechanism such as hydraulic, electric, or mechanical to orchestrate the closing and opening of the turbine blades 106 (a-f). Further the apparatus 100 may include sensing units to monitor the movement of the turbine blades 106 (a-f) and also measures the position of the turbine blades 106 (a-f). Furthermore, the apparatus 100 may also include a diagnostic unit to autocorrect the opening and closing sequences of the turbine blades 106 (a-f). Additionally, the apparatus 100 may include a transmitting unit to receive the sensed data from the sensing units and transmits the data to a remote monitoring unit. The plurality of turbine blades 106 includes six turbine blades: 106a, 106b, 106c, 106d, 106e, and 106f.

Generally, the turbine blades—106a, 106b, 106c, 106d, 106e, and 106f are made of the fibre reinforced plastic (FRP) webs surrounded by two FRP shells acting as aerodynamic fairings. FRP provides a lightweight structure to the turbine blades 106 (a-f). The plurality of turbine blades 106 (a-f) are shaped to generate the maximum power from the wind. Primarily the design is driven by the aerodynamic requirements. Just like an airplane wing, turbine blades 106 (a-f) operate by generating lift due to the shape of the turbine blades 106 (a-f). The more curved side generates low air pressures while high pressure air pushes on the other side of the aerofoil. The net result is a lift force perpendicular to the direction of flow of the air. In an embodiment the plurality of turbine blades 106 (a-f) include corrugations to increase the stiffness of the apparatus 100.

Apparatus 100 includes a generator 502, driven by top carousal shaft 202a and bottom carousal shaft 202b. For example, top carousal plate 104a turns a shaft that extends both above and below top carousal plates 104a, and 104b. The shaft that extends below top carousal plate 104a is matted with top offset shaft assembly 200. The offset shaft assembly 200 takes the center of the carousal and moves it to an offset position that allows turbine blades 106 (a-f) to open to its maximum position. Alternatively, a control sequence regulates the opening and closing of the turbine blades 106 (a-f). Subsequently, counterweight 204 offsets the weight of open turbine blades 106, driving the VAWT. Bottom carousel plate 104b also has a shaft extending through it, both above and below the plate. The shaft extending above the carousal plate is attached to the bottom of the offset shaft assembly. The shaft extending below the bottom carousal plate drives the generator 502.

Thus, the present VAWT can be installed in various locations, such as roofs, highways, and parking lots. Furthermore, the present VAWT apparatus produces less noise and can be scaled from milliwatts to megawatts. The present turbine has a simpler construction because the offset shaft is located within the turbine axis. Also, the counterweights of the present invention provide more stability to the offset shaft operation.

The air concentration at the VAWT can be increased. According to the embodiments illustrated herein, an air concentration tower (ACT) for VAWT is provided, which is shown and explained in conjunction with FIG. 6, FIG. 7 and FIG. 8.

Figure 6:
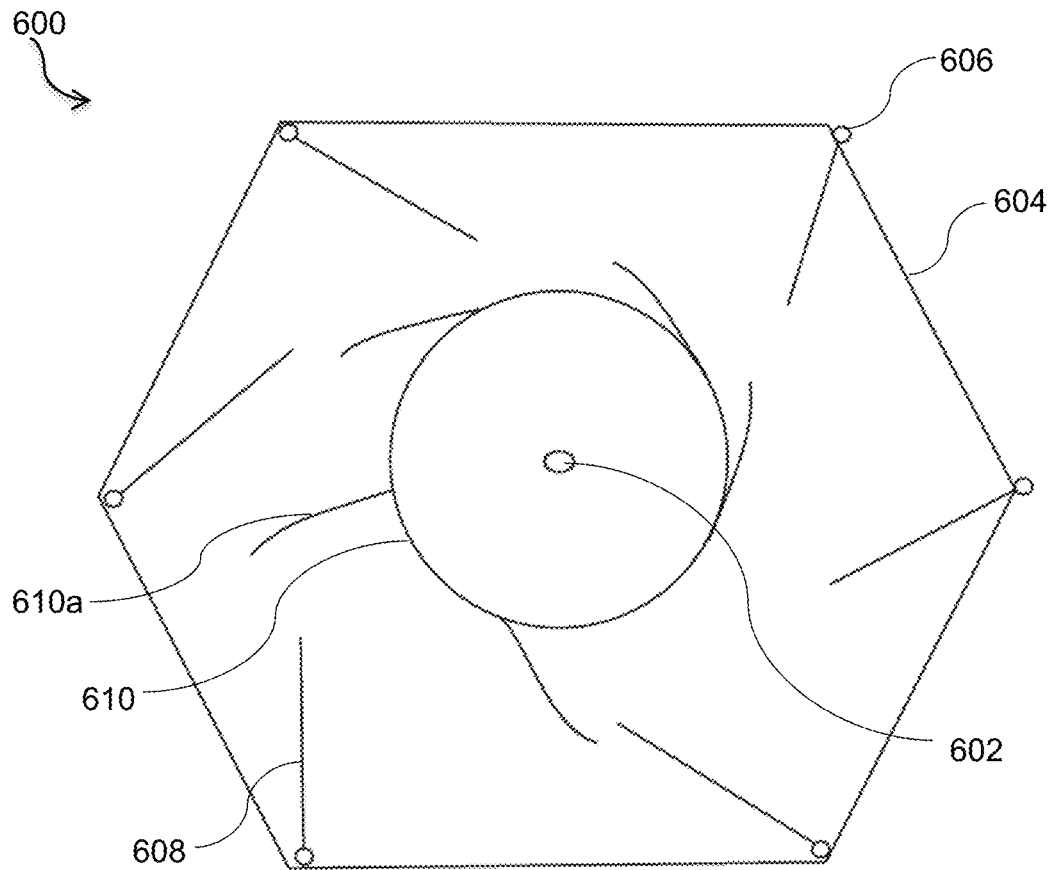
FIG. 6 illustrates a top view of an air concentration tower for a vertical axis wind turbine.

FIG. 6 illustrates a top view of an air concentration tower for vertical axis wind turbines, in accordance with at least one embodiment. The air concentration tower for vertical axis wind turbine 600 comprises a fixed turbine axis 602, a polygonal outer perimeter (aka "circumference") 604, a pivot 606 (also known in the art as a "link" or "joint") located at each vertex of the polygonal outer perimeter 604, a rudder blade 608 and a vertical axis wind turbine (VAWT) 610.

In an embodiment, the vertical axis wind turbine 610 is an elliptical VAWT comprising a plurality of turbine blades 610a (explained above in detail). The air concentration tower 600 channels airflow into the VAWT 610.

The expression 'polygonal outer perimeter' or 'polygon' may be interchangeably used without departing from the meaning and scope of the present invention.

The turbine illustrated in FIG. 6 has fixed turbine axis 602 (a central axis, i.e., an axis perpendicular to the ground about which the VAWT 610 rotates to generate power). The pivot 606 located at each vertex of the polygonal outer perimeter 604 is mechanically linked, and oscillates the rudder blade 608 operatively connected to the pivot 606. Structurally, the pivot may be integrated with a top lip and a bottom lip (discussed below), or provided as a separate structural frame (not shown in the Figures). Each of the top lip and bottom lip comprise structure from the outer perimeter 604 to an interior perimeter. Accordingly, although static structures are illustrated for each pivot, it is readily apparent to those of ordinary skill in the art upon reading the disclosure that other mechanical pivots, joints, or links may be used and achieve similar results without departing from the scope and definition of the invention, such as couplings and a connector rods, wheel-and-axis, or cylinder joints, for example.

The rudder blade 608 is an inwardly-positioned pivotable rudder, which has a first wind-neutral position, and is pivotable through a plurality of angles that adjust based on the incoming wind direction, such that the incoming wind is channeled to the VAWT 610 located approximately at the center area of the polygon 604.

The rudder blade 608 may be steady in the absence of wind, but in the presence of airflow the rudder blade 608 adjusts itself according to the wind direction and channels the wind to the VAWT 610 to generate power efficiently. The rudder blade 608 is designed so as to minimize aerodynamic drag. In one embodiment, the rudder blade 608 may be a swing rudder blade, while in alternative embodiments it is a fixed rudder blade. Preferably, the rudder blade is made of fiber reinforced plastic (FRP), metal, composites, or any equivalent material which are readily apparent to those of skill in the art.

Although a solid rudder blade that completely contours to the top lip and bottom lip is shown, it is readily apparent to those of ordinary skill in the art upon reading the disclosure that a rudder blade may have cuts or shape that can enhance its performance, and so these alternatives may be used and achieve similar results without departing from the scope of the invention.

In operation, the top lip and the bottom lip are preferably static, and allow each rudder blade to move therebetween. The air concentration tower 600 further comprises at least one generator 702 (shown and explained in conjunction with FIG. 7 and FIG. 8).

Figure 7:
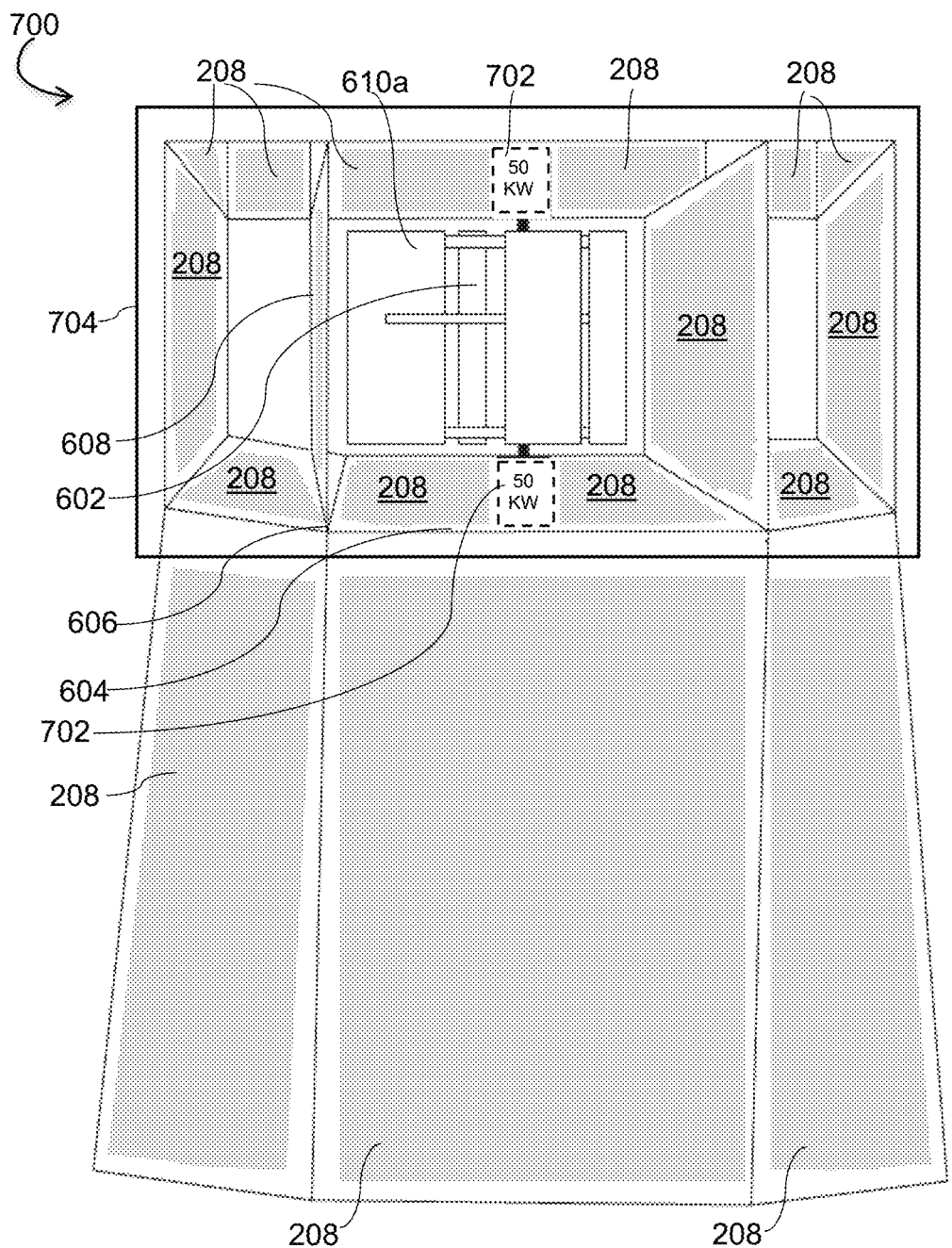
FIG. 7 illustrates a side view of a single-module air concentration tower for a vertical axis wind turbines.

FIG. 7 illustrates a side view of a single-module air concentration tower for vertical axis wind turbines mounted upon a pedestal. The single-module air concentration tower 700 comprises a single-module 704 having a fixed turbine axis 602, the polygonal outer perimeter 604, the pivot 606 located at each vertex of the polygonal outer perimeter 604, the rudder blade 608 and the vertical axis wind turbine (VAWT) 610 as also described in FIG. 6, where the VAWT 610 comprises the plurality of turbine blades 610a. The single-module 704 of the air concentration tower 700 further comprises one or more generators 702.

From FIG. 7 one can see that the outer perimeter is defined by a trapezoidal top-lip that tapers from the outer perimeter to an interior perimeter, and a trapezoidal bottom-lip that tapers from the outer perimeter to the interior perimeter. Further, each rudder blade is likewise trapezoidal and tapers from a maximum length along the outer perimeter to a smaller length at the interior perimeter. Although flat and trapezoidal sections are illustrated for the top lip and the bottom lip, it is readily apparent to those of ordinary skill in the art upon reading the disclosure that a continuous round (or oval) top lip or a continuous round (or oval) bottom lip may be used and achieve similar results.

The rudder blade 608 of the single-module 704 is inwardly-positioned, having a first wind-neutral position, and is pivotable through a plurality of discrete or continuous angles that adjust based on the incoming wind direction, such that the incoming wind is channeled to the VAWT 610 located approximately at the center area of the polygon 604. In the presence of the incoming wind, the rudder blade 608 of the single-module 704 starts adjusting itself in order to channel the incoming wind to the VAWT 610. Simultaneously, the incoming wind is forced to open the plurality of turbine blades 610a of the VAWT 610 of the single-module 704 in order to turn on the one or more generators 702 and to produce power by combining outputs of the one or more generators.

In one embodiment, each generator has, but is not limited to, 50 KW power generation capacity provided through a 50 KW generator. The VAWT 610 turns each generator 702 to produce power as in understood by those of ordinary skill in the power generation arts. In one embodiment, the single-module air concentration tower 700 comprises two generators 702 (i.e., an upper generator and a lower generator). The upper and lower generators, each having a capacity of 50 KW, produce 100 KW by combining the outputs of the upper and lower generators. In yet another alternative embodiment, the single-module air concentration tower 700 comprises more than two generators.

The single-module 704 of the air concentration tower 700 has the capability of channeling the wind flow through the single-module 704 so as to increase the wind speed and thus the power output at the VAWT 610. The wind speed and power at the VAWT 610 can further be increased if a plurality of single-modules 704 are stacked up in a tower configuration 800.

Accordingly, the present invention provides the ability to stack the plurality of single-modules 704 in the tower configuration 800. The plurality of single-modules 704, once stacked up in the tower configuration, form and define a multiple-module air concentration tower.

Figure 8:
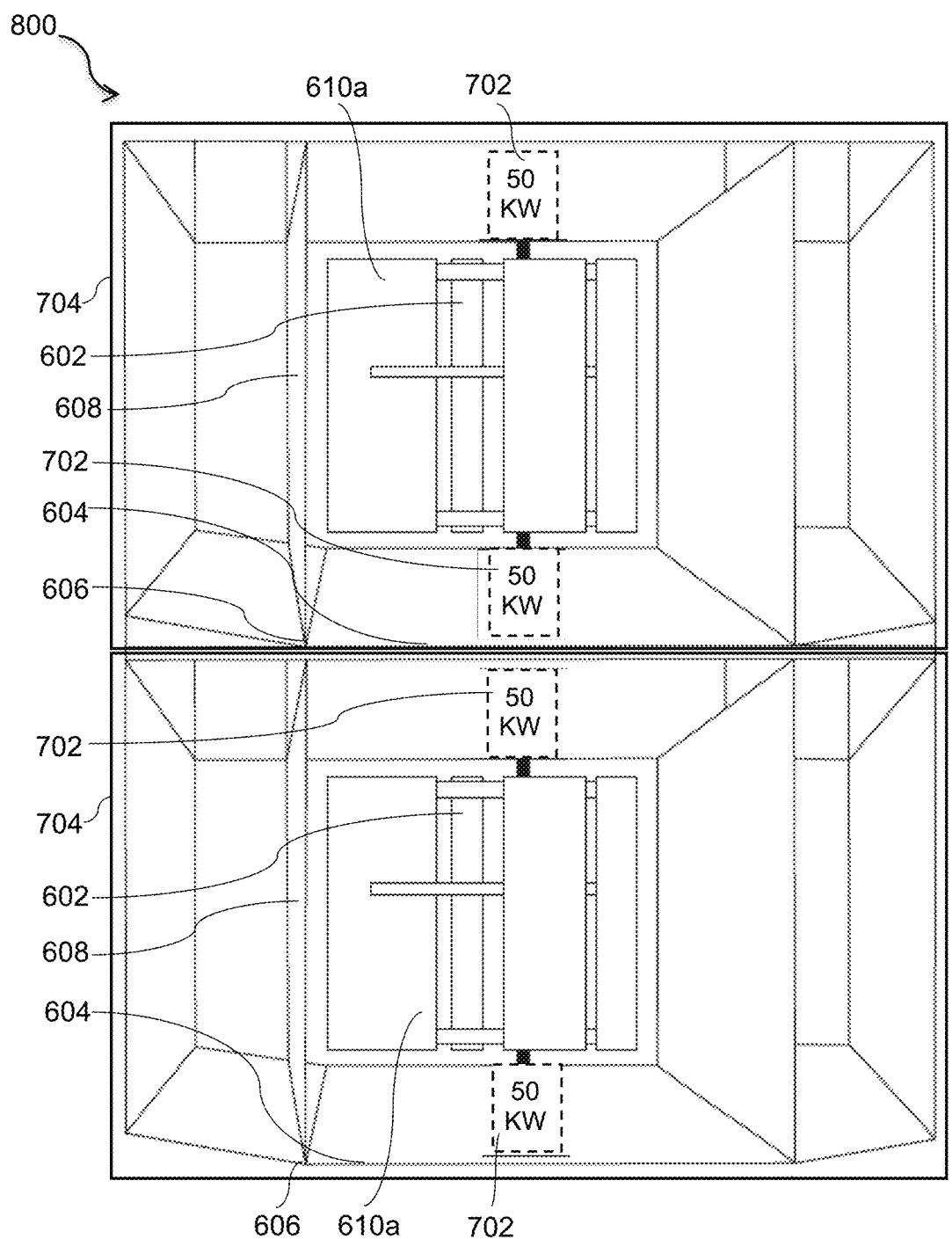
FIG. 8 illustrates a side view of a multiple-module air concentration tower for vertical axis wind turbines.

FIG. 8 illustrates a side view of a multiple-module air concentration tower for vertical axis wind turbines (MMACT VWAT), in accordance with at least one embodiment. In an exemplary embodiment, the multiple-module air concentration tower comprises two single-modules 704. In an alternative embodiment, the multiple-module air concentration tower may have more than two single-modules 704.

Each of the plurality of single-modules 704 comprises the fixed turbine axis 602, the polygonal outer perimeter 604, the pivot 606 located at each vertex of the polygonal outer perimeter 604, the rudder blade 608 and the vertical axis wind turbine (VAWT) 610 as also described in FIG. 6 and FIG. 7. As previously discussed, the VAWT 610 comprises the plurality of turbine blades 610a. The multiple-module air concentration tower 800 further comprises at least one generator 702 in each of the plurality of single-modules 704.

The rudder blade 608 of each of the single-modules 704 is inwardly-positioned having a first wind-neutral position, and is discretely or continuously pivotable through a plurality of angles that adjust based on the incoming wind direction, such that the incoming wind is channeled to the VAWT 610 located approximately at the center area of the polygon 604. In the presence of the incoming wind, the rudder blade 608 of each of the plurality of single-modules 704 adjusts itself in order to channel the incoming wind to the VAWT 610 of each of the plurality of single-modules 704. Simultaneously, the incoming wind is forced to open the plurality of turbine blades 610a of the VAWT 610 in each of the plurality of single-modules 704 in order to turn the generator(s) 702. Therefore, air flow concentrates at the VAWT 610.

In one embodiment of the present invention, at least one generator has a 50 KW power generation capacity. Of course, many generator sizes are known and available in the arts and it is understood that any wind generator may be incorporated into the invention simply by varying the size and other parameters of the other components. These include, in KW: 25, 100, 225, 300, 500, 600, 750, 1000, 1500, 1600, 2000, and 2500, for example.

In a preferred embodiment of the invention the multiple-module air concentration tower 800 comprises four generators 702, i.e., an upper generator and a lower generator in each of the single-modules 704. The upper and lower generators of each of the plurality of single-modules 704, preferably provides a capacity of 50 KW, to produce 200 KW by combining the outputs of each generator.

In other words, each of the plurality of single-modules 704 forms a unit of 100 KW. Each of the plurality of single-modules 704 is stackable up to four units to provide a 400 KW capability from the air concentration tower. In an exemplary embodiment, the air concentration tower comprises two single-modules 704 to provide a 200 KW capability from the air concentration tower. In this way, the stacking up of the plurality of single-modules 704 permits its practitioner to channel wind flow through each of the plurality of single-modules 704 so as to increase the wind speed and power at each VAWT. Similarly, generators of other sizes may be stacked to provide an array of desired power outputs.

In one embodiment of the present invention, the vertical axis wind turbine, which is an elliptical vertical axis wind turbine (EVAWT) is 30 feet in diameter. The generator 702 is 70 feet wide and 50 feet tall. The base of the air concentration tower is 90 feet and tapers to 70 feet at 100 feet, where the generator 702 is attached.

Likewise, these dimensions may scale. For example, in an alternative embodiment of the invention, the vertical axis wind turbine (EVAWT) is 3 feet in diameter. The base of the air concentration tower is 9 feet and tapers to 7 feet at 10 feet, where the generator 702 is attached. Similarly, here, the generator 702 is about 7 feet wide and about 5 feet tall.

In embodiments, the air concentration tower has a shape and placed or oriented in such a way that reduces its radar cross section (RCS) as is described below. Alternatively, the air concentration tower is manipulatable into a shape and/or orientation that reduces its RCS. Additionally, the VAWT may also be shaped, oriented, or manipulated into a shape or orientation that reduces its radar cross section. Of course, ideally both the air concentration tower and the VAWT are shaped, formed and placed or oriented in such a way that reduce the radar cross section. In embodiments, these manipulations may be initiated remotely and/or automatically in response to various radar operating conditions (or desired radar operating conditions).

According to various embodiments of the present invention, each rudder blade 608 is shaped to be RCS reducing. Additionally, the plurality of turbine blades 610*a* is shaped to be RCS reducing.

In other arts, it is appreciated that radar waves from a radar source travel to an object and are then reflected by that object. Flat surfaces on that object that reflect incoming radar signals away from a radar receiving station (typically co-located with the radar source) generate the smallest received radar signal. Accordingly, in an embodiment, the air concentration tower has a cross-section with a perimeter of a polygonal shape, such as an hexagonal shape, having one corner of which is oriented towards the radar source. Ideally, the top of the air concentration tower also has flat surfaces, preferably formed as triangles that meet at a center point (in this case to form the appearance of a hexagonal pyramid).

Of course, other polygonal shapes are possible such as a quadrilateral, pentagon, heptagon, octagon, and the like, where each polygon has a corresponding top portion (tetrahedron, pentagonal pyramid, heptahedral or heptahedron, octagonal pyramid, and the like). These polygons may be regular (all sides having the same approximate length) or irregular and/or oblong.

Sometimes, multiple radars are present in an area. Additionally, sometimes a radar signal is generated at one location and received at a second or third location. In these complex conditions, the air concentration tower may have an oblong or unexpected shape (such as a rhombus or trapezoid).

Referring back to FIG. 2 that shows the offset shaft assembly and FIG. 7 that illustrates the side view of the single-module air concentration tower for the vertical axis wind turbines. The components of the offset shaft assembly and the air concentration tower are applied with a radar absorbing/absorbent material (RAM) 208 that minimizes reflection of radar beams by absorbing them. The RAM 208 may be applied to or attached to one or more components of the offset shaft assembly, as well as to the air concentration tower. In embodiments, the RAM 208 may be applied in a webbed structure form. Additionally, the RAM may be applied in the form of a surface coating. The RAM 208 may be in the form of an iron ball paint, a Jaumann, a carbon nanotube, or a split-ring resonator and a foam, for example. The RAM preferably comprises at least one of carbonyl iron or ferrite, interspersed ferric compound particles, neoprene material, or a urethane foam having conductive carbon black, for example.

Each rudder 608 may also be coated or covered on each side with the RAM, and is also mechanically limited to prevent any rudder 608 from presenting a flat surface to a radar source (and, alternative, avoiding presenting a reflective surface that would direct radar waves towards a known radar-receiver).

In embodiments, it may be desirable to have the RAM coupled only to those surfaces of the VAWT and ACT that face nearby radar source(s). Accordingly, in embodiments, those exterior surfaces of the ACT and VAWT that face a radar source are substantially covered or coated with the RAM.

The RAM preferably coats or is attached to the entirety of the surfaces that may face a radar source. However, it is appreciated that due to mechanical wear, and/or for smoother mechanical operation, it may be desirable in some embodiments to coat or cover substantially the entirety of the surfaces while allowing portions of surfaces that are subject to mechanical wear or which require lubrication to go uncoated and/or uncovered.

Figure 6A:
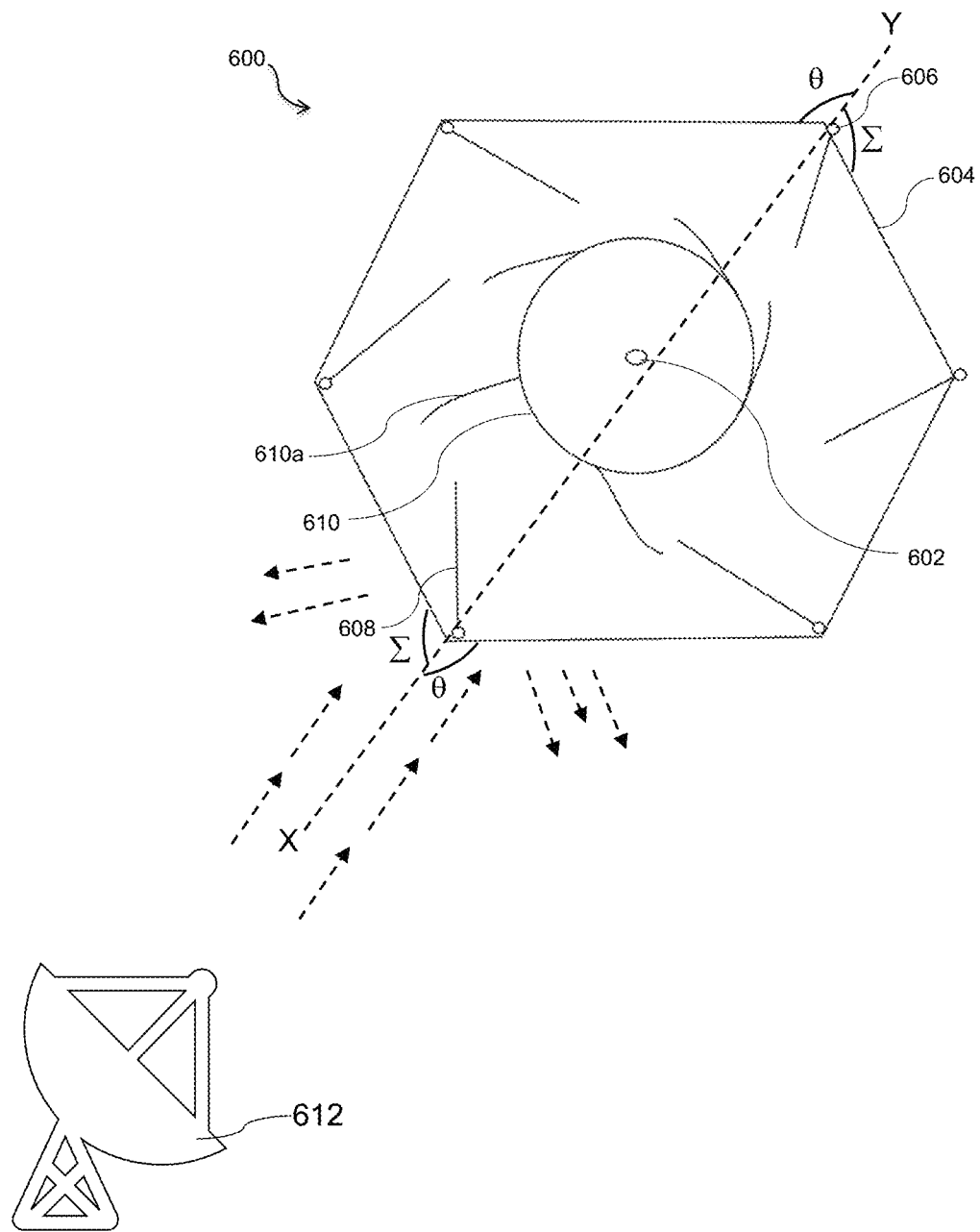
FIG. 6*a* illustrates the top view of the air concentration tower for the vertical axis wind turbine showing radar cross section mitigation.

In addition to the application of the RAM that absorbs the radar beams and reduces the radar cross section, the air concentration tower is further structured to be almost flat and oriented to deflect the incoming radar beams (shown by arrows in FIG. 6*a*). The flat and properly-oriented (here shown as a corner-orientation) air concentration tower causes radar beams to reflect at angles that then bounce off away from the radar collectors/receivers. Shown in FIG. 6*a*, a preferred ACT has a polygonal/hexagonal cross-sectional shape, with sharp vertex/corners/edges that avoid reflecting the radar beams back to the source/receiver/collector, but instead directs these radar waves into space away from any collector/receiver, thereby reducing its radar cross section.

Due to the sharp vertex/corners/edges of the ACT as explained above, angles (incident angles $\Sigma$ (sigma) and $\theta$ (theta)) at which the radar beams hit a particular portion of the ACT are high when measured with reference to an imaginary axis XY as shown in FIG. 6*a*. In embodiments, the incident angles $\Sigma$ (sigma) and $\theta$ (theta) are between 90 degrees to 150 degrees with respect to the imaginary axis XY. Preferably, as in the illustrated embodiment, the incident angles $\Sigma$ (sigma) and $\theta$ (theta) are each 120 degrees with respect to the imaginary axis XY.

In regular polygons, $\Sigma$ (sigma) and $\theta$ (theta) are equal, and subject to the well-understood limitation that exterior angels of regular polygons always sum to 360-degrees. However, in irregular polygonal configurations, $\Sigma$ (sigma) and $\theta$ (theta) may be different. Preferred angles of $\Sigma$ (sigma) and/or $\theta$ (theta) include: 100 degrees, 135 degrees, and 160 degrees, for example (however, preferably do not present at or near 90 degrees, which would likely reflect radar waves back in the direction of the transmitter, and likely receiver location).

Because the surfaces of the ACT are generally and preferably flat, the angles of incidence of the radar source incoming to each surface, will be the same as the angles of reflection of the radar waves and thus orient reflected radar waves away from the radar source(s).

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents. No language in the specification should be construed as indicating any non-claimed element as essential to the practice of the invention.

What is claimed is:

1. A vertical axis wind turbine air concentration tower with reduced radar cross section, comprising:
   a polygonal outer perimeter;
   a pivot located at each vertex of the polygonal outer perimeter;
   a rudder blade mechanically linked to the pivot to change position based on an incoming wind direction, the rudder blade being inwardly-positioned, having a first wind-neutral position, and is pivotable through a plurality of angles; and a radar absorbent material coupled to an exterior surface of the vertical axis wind turbine air concentration tower.

2. The device of claim 1 wherein the polygonal outer perimeter comprises a plurality of flat surfaces, where each flat surface is angled to reflect incoming radar waves away from a known radar receiver.

3. The device of claim 2 further comprising a vertical axis wind turbine, the vertical axis wind turbine having radar absorbent material coupled thereto.

4. The device of claim 2, wherein
an XY axis is defined by a line that bisects a corner that that is most oriented towards the radar source,
defining an angle sigma as an angle defined by the XY axis and an exterior surface that faces away from a radar source to the left of an incoming radar wave,
defining an angle theta as an angle defined by the XY axis and an exterior surface that faces away from a radar source to the right of an incoming radar wave,
the angles Σ (sigma) and θ (theta) are between 95 degrees to 150 degrees.

5. The device of claim 4 wherein the angles Σ (sigma) and θ (theta) are each 120 degrees.

6. The device of claim 1 wherein the radar absorbent material comprises at least one of carbonyl iron or ferrite, interspersed ferric compound particles, neoprene material, or a urethane foam having conductive carbon black.

7. The device of claim 3 wherein a rudder blade is configured to channel incoming wind to the vertical axis wind turbine located at a center area of the polygonal outer perimeter.

8. The device of claim 7 wherein the vertical axis wind turbine comprises a plurality of wings, and the wings are coated with a radar absorbent material.

9. The device of claim 7 the radar absorbent material is a carbonyl iron.

10. The device of claim 7 wherein the vertical axis wind turbine is an elliptical vertical axis wind turbine.

11. The device of claim 7 further comprising an energy storage device being coupled to the vertical axis wind turbine.

12. The device of claim 7 wherein the vertical axis wind turbine comprises an offset-turbine axis.

* * * * *